(12) United States Patent
Nishiyama

(10) Patent No.: US 7,418,778 B2
(45) Date of Patent: Sep. 2, 2008

(54) METHOD FOR PRODUCING A CPP THIN-FILM MAGNETIC HEAD

(75) Inventor: Yoshihiro Nishiyama, Tokyo (JP)

(73) Assignee: TDK Corporation, Tokyo (JP)

( * ) Notice: Subject to any disclaimer, the term of this patent is extended or adjusted under 35 U.S.C. 154(b) by 484 days.

(21) Appl. No.: 11/136,211

(22) Filed: May 24, 2005

(65) Prior Publication Data
US 2005/0264947 A1 Dec. 1, 2005

(30) Foreign Application Priority Data
May 31, 2004 (JP) ............................. 2004-161959

(51) Int. Cl.
*G11B 5/127* (2006.01)
*H04R 31/00* (2006.01)

(52) U.S. Cl. .............. 29/603.16; 29/603.13; 29/603.15; 29/603.18; 360/122; 360/317; 360/319; 451/5; 451/41; 216/62; 216/65; 216/66

(58) Field of Classification Search .............. 29/603.07, 29/603.11, 603.13–603.16, 603.18; 360/122, 360/126, 317, 319, 320; 451/5, 41
See application file for complete search history.

(56) References Cited

U.S. PATENT DOCUMENTS 5,907,459 A * 5/1999 Shouji et al. ................. 360/322
6,387,285 B1 * 5/2002 Sasaki ........................... 216/38
6,392,852 B1 * 5/2002 Sasaki ......................... 360/320

FOREIGN PATENT DOCUMENTS

| JP | 56-090535 | 7/1981 |
| JP | 09-326556 | 12/1997 |
| JP | 2002-74936 | 3/2002 |
| JP | 2003-059008 | 2/2003 |
| JP | 2003-152245 | 5/2003 |
| JP | 2004-031838 | 1/2004 |

OTHER PUBLICATIONS

Notification of Reasons for Refusal for corresponding Japanese Patent Application Serial No. 2004-161959 dated Jun. 12, 2007.

* cited by examiner

*Primary Examiner*—Paul D Kim
(74) *Attorney, Agent, or Firm*—Brinks Hofer Gilson & Lione

(57) ABSTRACT

A CPP thin-film magnetic head includes a bottom shield layer; a top shield layer, the bottom shield layer and the top shield layer being disposed at a predetermined interval; a thin-film magnetic head element between the bottom shield layer and the top shield layer; an insulating layer behind the thin-film magnetic head element in the height direction and disposed between the bottom shield layer and the top shield layer; and a metal layer in the insulating layer, the top shield layer including a first top shield sublayer on the thin-film magnetic head element; and a second top shield sublayer behind the first top shield sublayer in the height direction, the second top shield sublayer and the bottom shield layer being conductively connected through the metal layer, wherein a current flows in the direction orthogonal to a surface of a layer constituting the thin-film magnetic head element.

3 Claims, 4 Drawing Sheets

US 7,418,778 B2

METHOD FOR PRODUCING A CPP THIN-FILM MAGNETIC HEAD

This application claims the benefit of priority to Japanese Patent Application No. 2004-161959, filed on May 31, 2004, herein incorporated by reference.

BACKGROUND OF THE INVENTION

1. Field of the Invention

The present invention relates to a CPP thin-film magnetic head in which a sense current flows in the thickness direction (direction orthogonal to the film surface) and a method for producing the CPP thin-film magnetic head.

2. Description of the Related Art

Giant magnetoresistive devices (GMR devices) and tunneling magnetoresistive devices (TMR devices), which are used as thin-film magnetic heads, can be broadly divided into a current-in-plane (CIP) mode device, in which a sense current flows in the direction parallel to a surface of a layer constituting the device; and a current-perpendicular-to-plane mode deviate, in which a sense current flows in the direction perpendicular to a surface of a layer constituting the device.

FIG. 11 is a fragmentary sectional view of a traditional CPP thin-film magnetic head. The CPP thin-film magnetic head includes a bottom shield layer 110, a top shield layer 130, the bottom shield layer 110 and the top shield layer 130 being disposed at a predetermined interval, a thin-film magnetic head element 120 opposite a surface of a storage medium and between the bottom and top shield layers 110 and 130, and an insulating layer 140 interposed between the bottom and top shield layers 110 and 130 and disposed behind the thin-film magnetic head element 120 in the height direction. The top shield layer 130 is separated into a first top shield sublayer 131 on the thin-film magnetic head element 120 and a second top shield sublayer 132, the second top shield sublayer 132 being disposed behind the first top shield sublayer 131 in the height direction and conductively connected to the bottom shield layer 110 via a contact hole 141 in the insulating layer 140. Shield underlying layers (not shown) are provided directly below the respective bottom shield layer 110 and the top shield layer 130.

Japanese Unexamined Patent Application Publication Nos. 2002-74936 and 2002-157711 and International Publication No. WO97/44781 (equivalent: PCT Japanese Translation Patent Publication No. 11-509956) are disclosed below. As indicated by the arrow in FIG. 11, a sense current I flows from the first top shield sublayer 131 to the second top shield sublayer 132 through the thin-film magnetic head element 120 and the bottom shield layer 110. Alternatively, the sense current I flows from the second top shield sublayer 132 to the first top shield sublayer 131 through the bottom shield layer 110 and the thin-film magnetic head element 120. The first top shield sublayer 131 and the second top shield sublayer 132 function as passages for the sense current I. In such a CPP thin-film magnetic head including the bottom shield layer 110 and the top shield layer 130 both functioning as electrodes, to reduce a resistance that does not contribute to an element output and the output noise of the element due to an change in the resistance, it is necessary to be free of any oxide layer at interfaces between the thin-film magnetic head element 120 and the bottom shield layer 110 and between the thin-film magnetic head element 120 and the top shield layer 130. Thus, in forming the thin-film magnetic head element 120 on the bottom shield layer 110 and in forming the top shield layer 130 on the thin-film magnetic head element 120, pretreatment is typically conducted to remove a surface oxide layer by, for example, etching.

In the pretreatment before formation of the top shield layer 130, a surface oxide film on the thin-film magnetic head element 120 and a surface oxide film on the bottom shield layer 110 exposed at the contact hole 141 in the insulating layer 140 are removed by etching at the same time. In this manner, since the surface of the bottom shield layer 110 has already been exposed to air at previous steps (for example, a step of forming the thin-film magnetic head element 120), the surface oxide layer on the bottom shield layer 110 is thicker than that of the surface oxide layer on the thin-film magnetic head element 120. Thus, to completely remove the surface oxide layer on the bottom shield layer 110, more than the usual amount of etching is required. However, an increase in the amount of etching for the complete removal of the surface oxide layer on the bottom shield layer 110 results in the deeply etched surface of the thin-film magnetic head element 120, thus causing great damage to the element. Therefore, a thick cap layer, which is the uppermost layer of the thin-film magnetic head element 120, must be provided, thereby preventing a reduction in the interval between the shield layers. Formation of the cap layer composed of a material having oxidation resistance permits minimization of the amount of etching of the thin-film magnetic head element 120. A reduction in the amount of etching in order to avoid the damage of the thin-film magnetic head element 120 results in insufficient removal of the surface oxide layer of the bottom shield layer 110, thereby destabilizing a contact resistance between the bottom shield layer 110 and the second top shield sublayer 132. Furthermore, a resistance that does not contribute to the element output may increase to reduce the element output. Formation of the bottom shield layer 110 composed of a material, for example, ruthenium, having oxidation resistance reduces the amount of etching of the bottom shield layer 110 exposed at the contact hole 141, thus solving the problem above. In view of magnetic shielding effect and the like, it is difficult to use the above-described material having oxidation resistance as the shield material in the present circumstances. This is because such a material, for example, ruthenium, having oxidation resistance does not have magnetic properties and does not exhibit the shield effect. Nowadays, there is no magnetic material having the shield effect and in which when the magnetic material is exposed to oxygen (air), the thickness of the resulting surface oxide layer is comparable to that of the surface oxide layer on the thin-film magnetic head element 120.

SUMMARY OF THE INVENTION

In view of the problem described above, the present invention has been accomplished. It is an object of the present invention to provide a CPP thin-film magnetic head capable of reducing noise of an element output, reducing a resistance that does not contribute to the element output, avoiding damage to the thin-film magnetic head element due to etching, and advantageously reducing an interval between the shield layers, and to provide a method for producing the CPP thin-film magnetic head.

The present invention is accomplished in consideration of the cause of the problem in which the top surface of the thin-film magnetic head element and the bottom shield layer are etched at the same time, and the amount of etching for removing the surface oxide layer on the top surface of the thin-film magnetic head element is different from that of the surface oxide layer on the bottom shield layer in the contact hole.

The present invention provides a CPP thin-film magnetic head including a bottom shield layer; a top shield layer, the bottom shield layer and the top shield layer being disposed at a predetermined interval; a thin-film magnetic head element between the bottom shield layer and the top shield layer; an insulating layer behind the thin-film magnetic head element in the height direction and disposed between the bottom shield layer and the top shield layer; and a metal layer in the insulating layer, the top shield layer including a first top shield sublayer on the thin-film magnetic head element; and a second top shield sublayer behind the first top shield sublayer in the height direction, the second top shield sublayer and the bottom shield layer being conductively connected through the metal layer, wherein a current flows in the direction orthogonal to a surface of a layer constituting the thin-film magnetic head element.

According to an embodiment, the second top shield sublayer is not in directly contact with the bottom shield layer. The top surface of the metal layer that conductively connects the second top shield sublayer with the bottom shield layer is the contact surface with the second top shield sublayer. Thus, the surface oxide layer on the bottom shield layer and the surface oxide layer on the thin-film magnetic head element can be removed in separate steps. Consequently, it is possible to completely remove the surface oxide layers on the thin-film magnetic head element and the bottom shield layer in the minimum amount of etching without causing damage to the thin-film magnetic head element.

Preferably, the top surface of the thin-film magnetic head element, the top surface of the insulating layer, and the top surface of the metal layer are in the same plane.

The size of the metal layer in the track width direction is preferably greater than that of the thin-film magnetic head element in the track width direction. Since this metal layer functions as an electrode together with the bottom shield layer and the second top shield layer, the resistance of the entire electrode can be reduced because of large area thereof.

The metal layer is preferably composed of at least one selected from the group consisting of gold, silver, copper, and platinum-group metals.

The insulating layer includes a contact hole under the second top shield sublayer and behind the thin-film magnetic head element in the height direction, the contact hole reaching the part of the bottom shield layer, the metal layer being provided in the contact hole.

According to another embodiment of the present invention, a method for producing a CPP thin-film magnetic head includes a thin-film magnetic head element and an insulating layer between a bottom shield layer and a top shield layer, the insulating layer being disposed behind the thin-film magnetic head element in the height direction, wherein a current flows in the direction orthogonal to a surface of a layer constituting the thin-film magnetic head element, the method including the steps of forming the insulating layer; forming a resist layer for lift-off processing on the thin-film magnetic head element and the insulating layer, the resist layer containing a space for forming a hole, the space being disposed at a predetermined position behind the thin-film magnetic head element in the height direction; removing the insulating layer exposed in the space and completely removing a surface oxide layer on the bottom shield layer directly below the insulating layer in the space, while the top surface of the thin-film magnetic head element is covered with the resist layer; forming a metal layer on the portion generated by removing the insulating layer and the surface oxide layer on the bottom shield layer, and then removing the resist layer by lift-off processing; and separating the top shield layer into a first top shield sublayer and a second top shield sublayer, the first top shield sublayer being disposed on the thin-film magnetic head element and the insulating layer, the second top shield sublayer being disposed on the insulating layer and the metal layer.

According to the embodiment described above, the step of removing the surface oxide layer on the bottom shield layer exposed in the space for forming a hole and the step of the surface oxide layer on the thin-film magnetic head element are performed separately, it is possible to surely remove the surface oxide layers on the thin-film magnetic head element and the bottom shield layer without causing damage to the thin-film magnetic head element. Moreover, since the surface oxide layer on the thin-film magnetic head element can be removed in the minimum amount of etching, there in no need to provide a thick cap layer, which is the uppermost layer of the thin-film magnetic head element. This is advantageous in reducing the interval between the shield layers. Since no oxide layer is present in the current path through the thin-film magnetic head element, a resistance that does not contribute to the element output and the output noise of the element due to a change in the resistance are reduced.

The insulating layer and the metal layer are preferably formed so as to have thicknesses such that the top surfaces of the insulating layer, the metal layer, and the thin-film magnetic head element are in the same plane.

The uppermost layer of the thin-film magnetic head element is preferably formed of a cap layer having a laminate structure containing a ruthenium film and a tantalum film. Then, in the step of removing the surface oxide layer on the metal layer, the tantalum film of the cap layer being completely removed to expose the ruthenium film, and then the first top shield sublayer being formed on the ruthenium film. To suppress the amount of etching for removing the surface oxide layer, the cap layer is preferably composed of a material, for example, ruthenium, having oxidation resistance. However, when ruthenium material is exposed at the top surface of the cap layer, photolithography is insufficiently performed. Thus, a tantalum film capable of being suitably processed by photolithography is stacked on the ruthenium film. Then, immediately before forming the first top shield sublayer, the tantalum film is completely removed.

The present invention provides a CPP thin-film magnetic head capable of reducing output noise of the element, reducing a resistance that does not contribute to the element output, avoiding damage to the thin-film magnetic head element due to etching, and advantageously reducing an interval between the shield layers, and provides a method for producing the CPP thin-film magnetic head.

DESCRIPTION OF THE PREFERRED EMBODIMENTS

The present invention will be described based on the drawings. In the respective drawings, the x-direction is a track width direction. The y-direction is the height direction (direction of leakage flux from a storage medium). The z-direction is the direction to which the storage medium moves and the stacking direction of layers constituting the thin-film magnetic head.

Figure 1:
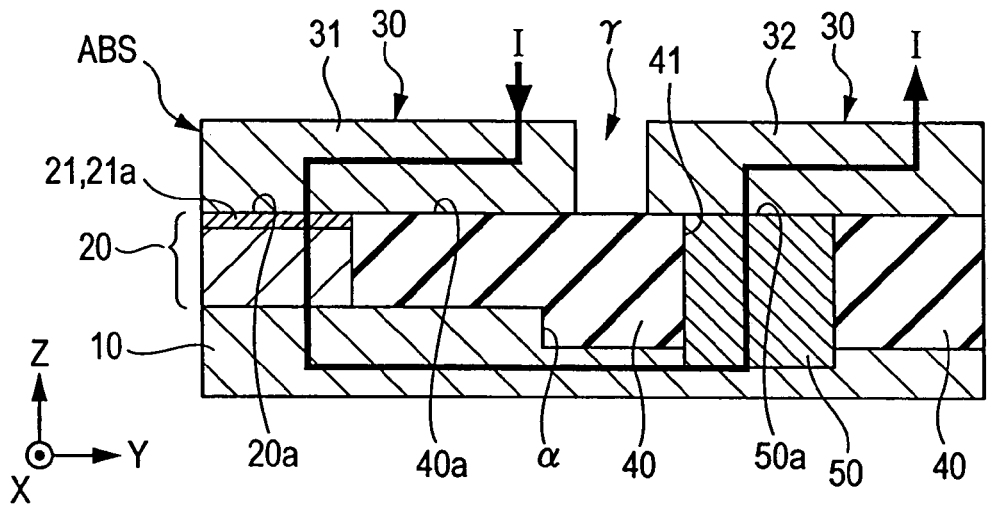
FIG. 1 is a fragmentary sectional view through the center of a CPP thin-film magnetic head according to an embodiment of the present invention.
Figure 2:
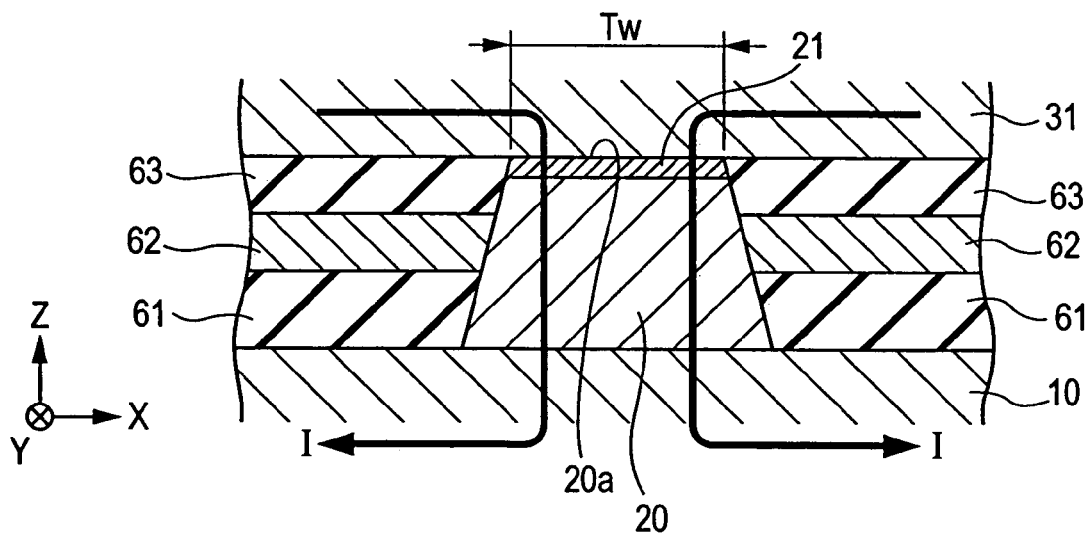
FIG. 2 is a fragmentary sectional view of the CPP thin-film magnetic head shown in FIG. 1 when viewed from the surface of the head opposite a storage medium.
Figure 3:
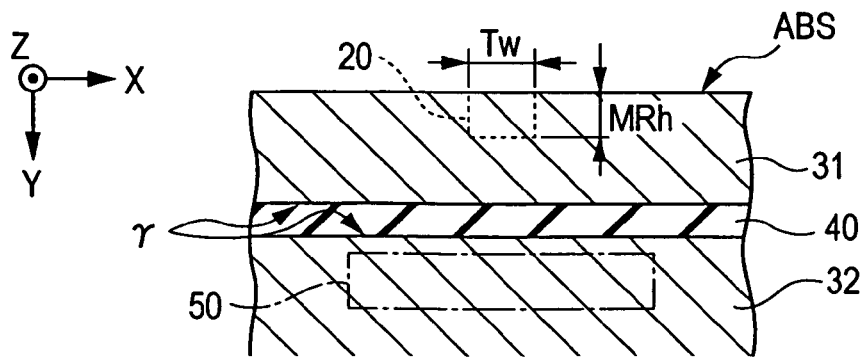
FIG. 3 is a schematic plan view of the CPP thin-film magnetic head when viewed from above.

FIGS. 1 to 3 each show a CPP thin-film magnetic head according to an embodiment of the present invention. FIG. 1 is a fragmentary sectional view through the center of a CPP thin-film magnetic head according to an embodiment of the present invention. FIG. 2 is a fragmentary sectional view of the CPP thin-film magnetic head shown in FIG. 1 when viewed from the surface of the head opposite a storage medium. FIG. 3 is a schematic plan view of the CPP thin-film magnetic head when viewed from above.

The CPP thin-film magnetic head includes a bottom shield layer 10 and a top shield layer 30 disposed at a predetermined interval in the z-direction shown in the figure. When a sense current I flows in a direction (z-direction shown in the figure) perpendicular to a surface of each layer constituting the thin-film magnetic head element 20, leakage flux from a storage medium is detected using a magnetoresistive effect.

The bottom shield layer 10 and the top shield layer 30 each function as both a magnetic shield and an electrode that supplies power to the thin-film magnetic head element 20. The bottom shield layer 10 and the top shield layer 30, each having a thickness of about 1 μm, each are composed of a soft magnetic material that exhibits a satisfactory magnetic shielding effect, for example, an iron-nickel alloy (NiFe). The top shield layer 30 includes a first top shield sublayer 31 on the thin-film magnetic head element 20 and a second top shield sublayer 32 behind the first top shield sublayer 31 in the height direction, the first top shield sublayer 31 and the second top shield sublayer 32 being separated. The first and second top shield sublayers 31 and 32 have a uniform thickness. The bottom shield layer 10, the first top shield sublayer 31, and the second top shield sublayer 32 each have a size larger than the track width Tw and the length MRh in the height direction of the thin-film magnetic head element 20 and have a sufficiently large area, thus exhibiting satisfactory magnetic shielding effect.

As is well known in the art, a giant magnetoresistive device (GMR device) and a tunneling magnetoresistive device (TMR device), both of which exhibit the giant magnetoresistive effect, may be used as the thin-film magnetic head element 20. As shown in FIGS. 2 and 3, the thin-film magnetic head element 20 is disposed at nearly midway between the bottom shield layer 10 and the first top shield sublayer 31 in the x-direction shown in the figure. The uppermost layer of the thin-film magnetic head element 20 is a cap layer 21 composed of a material, for example, ruthenium, gold, or copper, having oxidation resistance. The cap layer 21 according to this embodiment is a ruthenium film 21a about 3 nm in thickness. A first insulating layer 61, a hard bias layer 62, and a second insulating layer 63 are stacked in the order from the bottom shield layer 10 at both sides of the thin-film magnetic head element 20 in the track width direction. The first insulating layer 61 and the second insulating layer 63 are each composed of an insulating material, for example, alumina ($Al_2O_3$) or silica ($SiO_2$). The first insulating layer 61 and the second insulating layer 63 are interposed between the hard bias layer 62 and the bottom shield layer 10 and between the hard bias layer 62 and the first top shield sublayer 31, respectively. The hard bias layer 62 is magnetized in the x-direction shown in the figure and applies a longitudinal bias field to the free magnetic layer in the thin-film magnetic head element 20 to orient the magnetization in the x-direction shown in the figure. In fact, to improve the properties (coercive force and remanence ratio) of the hard bias layer 62, a bias underlying layer is provided directly below the hard bias layer 62 (not shown in FIG. 2). Furthermore, nonmagnetic metal layers may be interposed between the thin-film magnetic head element 20 and the bottom shield layer 10 and between the thin-film magnetic head element 20 and the first top shield sublayer 31, respectively, each of the nonmagnetic metal layers functioning as an electrode together with the bottom shield layer 10 or the first top shield sublayer 31.

An insulating layer 40 is provided behind the thin-film magnetic head element 20 in the height direction and between the bottom shield layer 10 and the top shield layer 30. The insulating layer 40 has a thickness such that the level (in the z-direction shown in the figure) of the top surface of the insulating layer 40 is the same as that of the top surface of the thin-film magnetic head element 20 (top surface of the cap layer 21). The first top shield sublayer 31 and the bottom shield layer 10 are conductively connected via the thin-film magnetic head element 20, and insulated by the insulating layer 40 behind the thin-film magnetic head element 20 in the height direction.

A contact hole 41 is provided in the insulating layer 40 under the second top shield sublayer 32 and behind the thin-film magnetic head element 20 in the height direction, the surface of the bottom shield layer 10 being partly exposed at the contact hole 41. A low-resistance metal layer 50 is provided in the contact hole 41 to conductively connect the bottom shield layer 10 with the second top shield sublayer 32. The low-resistance metal layer 50 is composed of a metal material having a resistivity lower than that of the bottom shield layer 10 and the top shield layer 30. The metal material preferably contains at least one metal selected from the group consisting of gold, silver, copper, and platinum-group metals such as platinum, palladium, rhodium, iridium, and osmium. The low-resistance metal layer 50 according to this embodiment has a laminate structure in which a chromium sublayer, a copper sublayer, a chromium sublayer, a tantalum sublayer, and a gold sublayer are stacked in that order from the bottom shield layer 10. The top surface 50a of the low-resistance metal layer 50 is in the same plane with the top surface 40a of the thin-film magnetic head element 20 (top surface of the cap layer 21). The first top shield sublayer 31 and the second top shield sublayer 32 are provided in the same level in the z-direction.

The second top shield sublayer 32 is conductively connected to the bottom shield layer 10 via the low-resistance metal layer 50, and is insulated from the first top shield sublayer 31 by the insulating layer 40. A path through which the sense current I flows is provided between the first top shield sublayer 31 and the second top shield sublayer 32 via the thin-film magnetic head element 20, the bottom shield layer 10, and the low-resistance metal layer 50. The sense current I flows from the first top shield sublayer 31 to the second top shield sublayer 32 through the thin-film magnetic head element 20, the bottom shield layer 10, and the low-resistance metal layer 50. Alternatively, the sense current I flows from the second top shield sublayer 32 to the first top shield sublayer 31 through the low-resistance metal layer 50, the bottom shield layer 10, and the thin-film magnetic head element 20. Each of the arrows indicated in FIGS. 1 and 2 shows a current path when the sense current I flows from the first top shield sublayer 31 to the second top shield sublayer 32. The length of the low-resistance metal layer 50 (and the contact hole 41) in the x-direction shown in the figure is greater than the track width Tw of the thin-film magnetic head element 20. The low-resistance metal layer 50 is in contact with the bottom shield layer 10 and the second top shield sublayer 32, over large contact areas. Thus, at the contact surface, the sense current I flows parallel to the contact surface (interface). As a result, the bottom shield layer 10 and the second top shield sublayer 32 have a low resistivity.

A method for producing the CPP thin-film magnetic head shown in FIGS. 1 to 3 will be described with reference to FIGS. 4 to 10.

Figure 4:
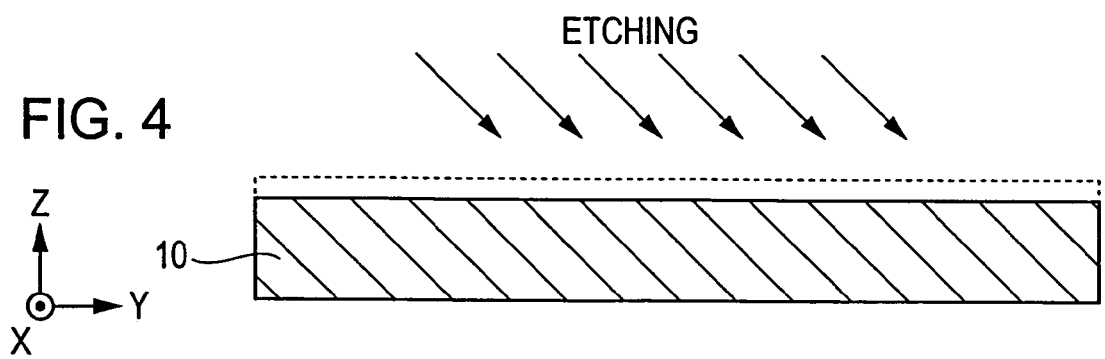
FIG. 4 is a fragmentary sectional view taken along the direction parallel to the height direction through the center of the CPP thin-film magnetic head for illustrating a step in a method for producing the CPP thin-film magnetic head shown in FIG. 1.
Figure 5:
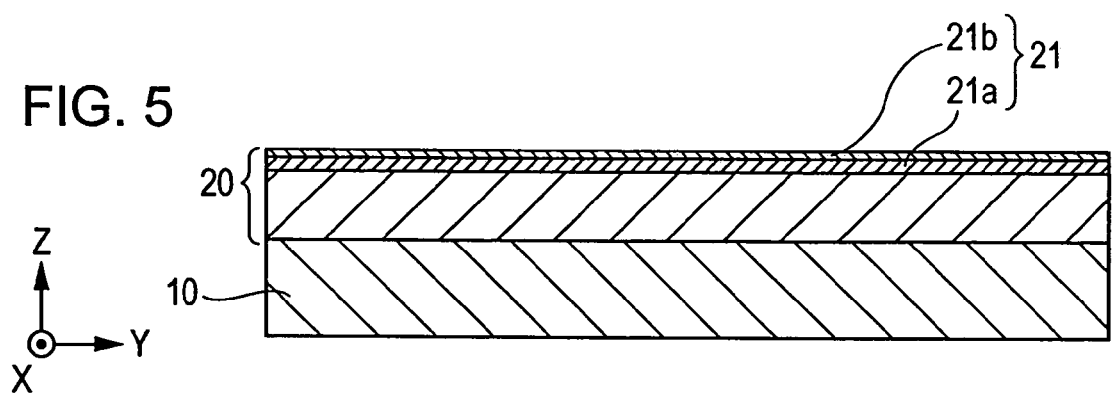
FIG. 5 is a fragmentary sectional view taken along the direction parallel to the height direction through the center of the CPP thin-film magnetic head for illustrating a step subsequent to the step shown in FIG. 4.

As shown in FIG. 4, the surface oxide layer on the bottom shield layer 10 is completely removed by, for example, etching to expose a fresh surface being free from an oxide layer. As shown in FIG. 5, layers for forming the thin-film magnetic head element 20 are stacked on the entire surface of the bottom shield layer 10. The cap layer 21 including two layers, i.e., the ruthenium film 21a and the tantalum film 21b, is formed as the uppermost layer of the thin-film magnetic head element 20. The surface of the ruthenium film is unsuitable for being processed by photolithography because of surface wettability and the like. Therefore, the tantalum film 21b is provided in order that photolithography is satisfactorily performed. The tantalum film 21b about 1 nm in thickness is formed so as to be completely removed by pretreatment before formation of the top shield layer.

Figure 6A:
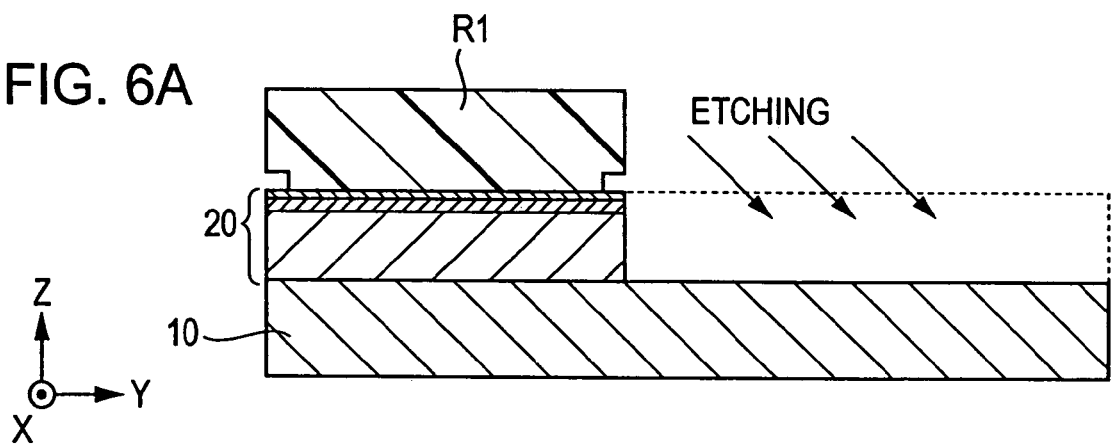
FIG. 6A is a fragmentary sectional view taken along the direction parallel to the height direction through the center of the CPP thin-film magnetic head for illustrating a step subsequent to the step shown in FIG. 5.
Figure 6B:
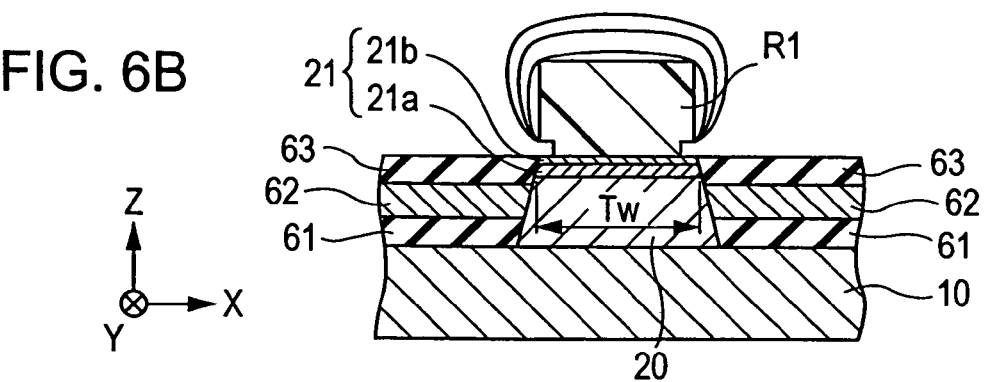
FIG. 6B is a fragmentary sectional view of the CPP thin-film magnetic head, when viewed from the surface of the head opposite a storage medium, for illustrating a step subsequent to the step shown in FIG. 5.

As shown in FIGS. 6A and 6B, subsequently, a first resist layer R1 determining the track width Tw of the thin-film magnetic head element 20 is formed on the cap layer 21. The first resist layer R1 will be removed by lift-off processing. Then, the layers which are not covered with the first resist layer R1 and provided for forming the thin-film magnetic head element 20 are removed by ion milling, etching, or the like to expose the bottom shield layer 10. In this step, the thin-film magnetic head element 20 being almost trapezoidal in cross section and having the track width Tw remains at the middle of the bottom shield layer 10 in the x-direction shown in the figure. Since some of the materials have been removed by ion milling are redeposited on both end faces of the thin-film magnetic head element 20 in the x-direction, these redeposited materials are preferably removed again by ion milling. The first insulating layer 61, the hard bias layer 62, and the second insulating layer 63 are successively formed by sputtering so that each of the layers is in contact with both end faces of the thin-film magnetic head element 20. Then, the first resist layer R1 is removed by lift-off processing.

Figure 7:
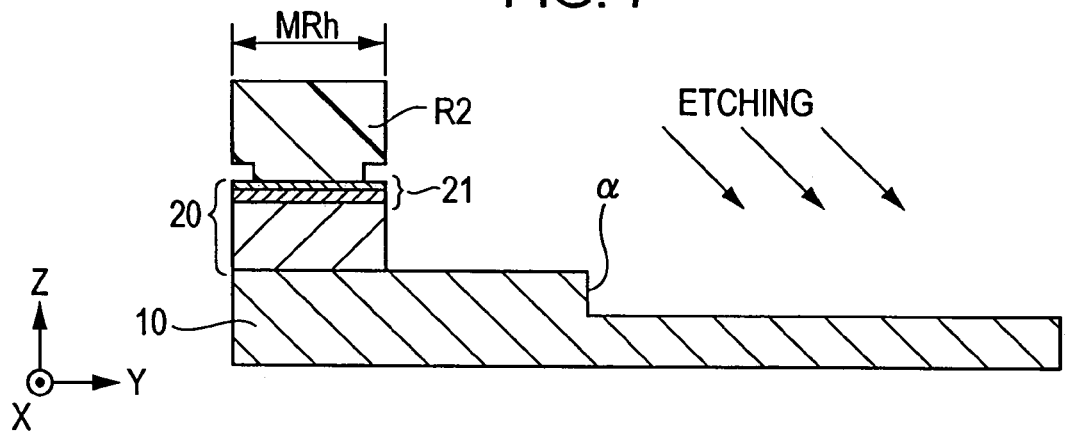
FIG. 7 is a fragmentary sectional view taken along the direction parallel to the height direction through the center of the CPP thin-film magnetic head for illustrating a step subsequent to the step shown in FIGS. 6A and 6B.

As shown in FIG. 7, a second resist layer R2 determining the length MRh in the height direction of the thin-film magnetic head element 20 is formed on the cap layer 21. The second resist layer R2 will be removed by lift-off processing. The layers, which are not covered with the second resist layer R2 and provided for forming the thin-film magnetic head element 20, and part of the bottom shield layer 10 are removed by, for example, ion milling or etching, thereby exposing a fresh surface of the bottom shield layer 10, which is free from a surface oxide layer, behind the thin-film magnetic head element 20 in the height direction. There is a step α at the boundary between the region of the bottom shield layer 10 exposed in this step and the region of the bottom shield layer 10 that has already been exposed in the previous step.

The insulating layer 40 composed of an insulating material such as $SiO_2$ is formed on the exposed bottom shield layer 10, in other words, the insulating layer 40 is formed on the bottom shield layer 10 and behind the thin-film magnetic head element 20 in the height direction. The insulating layer 40 has a thickness such that the level of the top surface of the insulating layer 40 is the same as that of the uppermost surface of the thin-film magnetic head element 20. Next, the second resist layer R2 is removed by lift-off processing.

Figure 8:
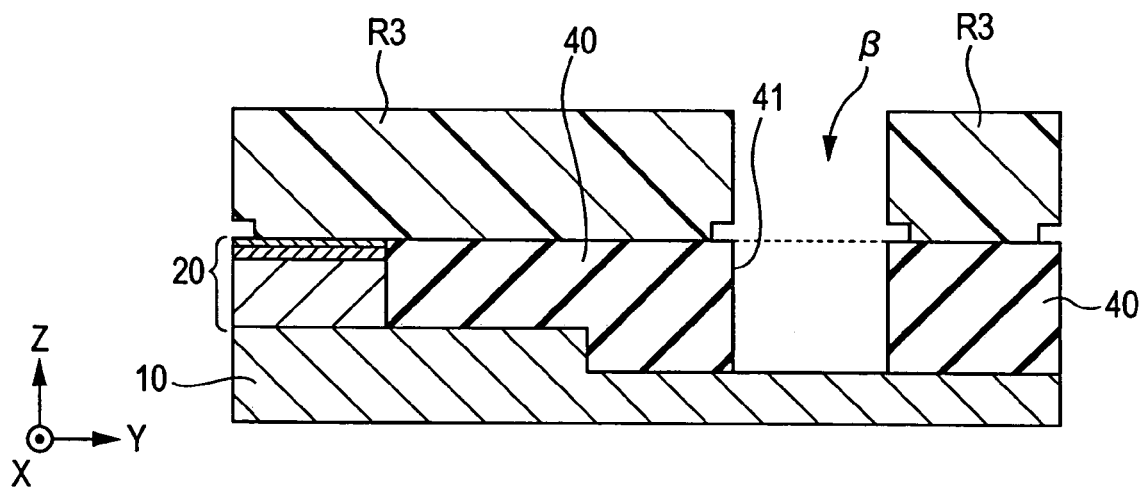
FIG. 8 is a fragmentary sectional view taken along the direction parallel to the height direction through the center of the CPP thin-film magnetic head for illustrating a step subsequent to the step shown in FIG. 7.

As shown in FIG. 8, a third resist layer R3 including a space β for the contact hole is formed on the thin-film magnetic head element 20 and the insulating layer 40, the space β being disposed at a predetermined position behind the thin-film magnetic head element 20 (and the step α on the bottom shield layer 10) in the height direction. The space β has a size greater than the track width Tw of the thin-film magnetic head element 20 in the x-direction in the figure. Furthermore, the space β has a size such that about 100 $\mu m^2$ of each of the contact areas between the low-resistance metal layer 50 and the bottom shield layer 10 and between the low-resistance metal layer 50 and the second top shield sublayer 32 can be ensured. Then, the insulating layer 40 exposed in the space β of the third resist layer R3 is removed by, for example, ion milling or etching to form a contact hole 41 and to expose the bottom shield layer 10 in the contact hole 41. The ion milling or etching is continued to completely remove a surface oxide layer on the bottom shield layer 10 exposed in the contact hole 41. During the ion milling or etching, since the top surface of the thin-film magnetic head element 20 is covered with the third resist layer R3, the thin-film magnetic head element 20 is not damaged. To completely remove the surface oxide layer, it is preferable to expose the bottom shield layer 10 in the contact hole 41 and then to further perform ion milling or etching to reduce the bottom shield layer 10 by about 10 nm in depth.

Figure 9:
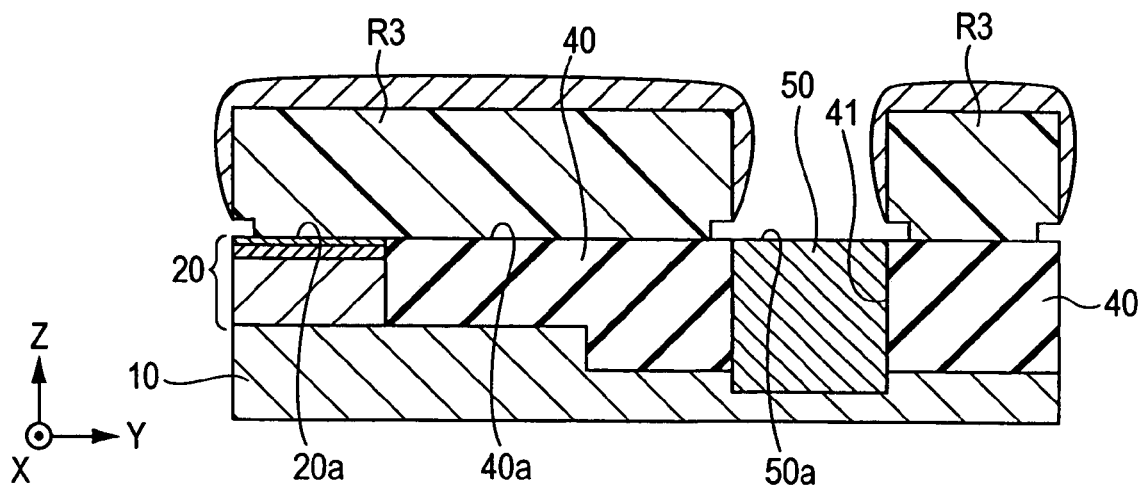
FIG. 9 is a fragmentary sectional view taken along the direction parallel to the height direction through the center of the CPP thin-film magnetic head for illustrating a step subsequent to the step shown in FIG. 8.

As shown in FIG. 9, a low-resistance metal layer 50 is formed on the fresh surface of the bottom shield layer 10 being free from a surface oxide layer while the third resist layer R3 remains. Consequently, no surface oxide layer is present at the interface between the bottom shield layer 10 and the low-resistance metal layer 50. As a result, the bottom shield layer 10 is surely in contact with the low-resistance metal layer 50, thus stabilizing the contact resistance. The low-resistance metal layer 50 is preferably composed of a metal material having a resistivity lower than those of the bottom shield layer 10 and the top shield layer 30. In particular, the low-resistance metal layer 50 is preferably composed of at least one selected from the group consisting of gold, silver, copper, and platinum-group materials (platinum, palladium, rhodium, ruthenium, iridium, and osmium). The low-resistance metal layer 50 according to this embodiment has a laminate structure in which a chromium sublayer, a copper sublayer, a chromium sublayer, a tantalum sublayer, and a gold sublayer are stacked in that order from the bottom shield layer 10. The low-resistance metal layer 50 is formed so as to have a thickness such that the level (in the z-direction) of the top surface 50a of the low-resistance metal layer 50 is the same as that of the top surface 40a of the insulating layer 40. In other words, the low-resistance metal layer 50 is formed so as to have a thickness such that the top surface 50a of the low-resistance metal layer 50, the top surface 40a of the insulating layer 40, the top surface of the thin-film magnetic head element 20 (top surface of the cap layer 21) are in the same plane. After the formation of the low-resistance metal layer 50, the third resist layer R3 is removed by lift-off processing.

Figure 10:
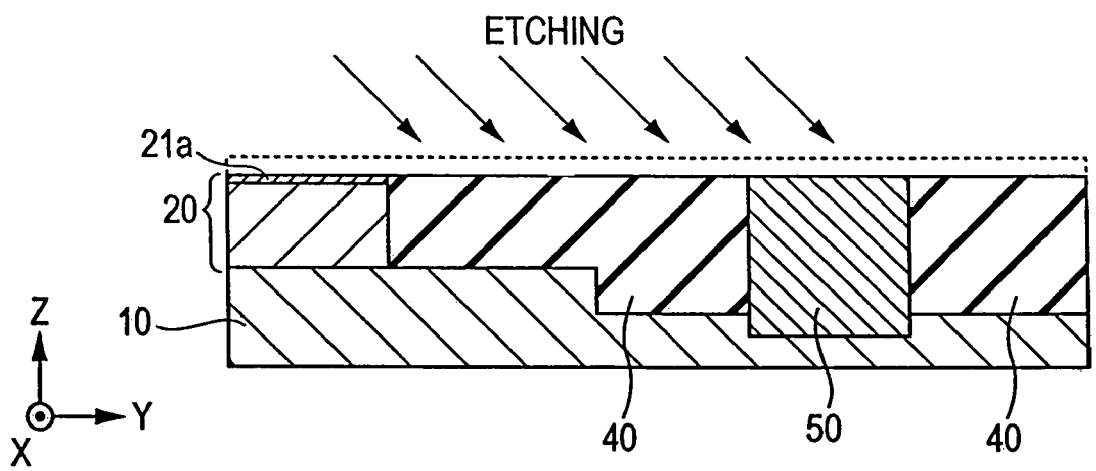
FIG. 10 is a fragmentary sectional view taken along the direction parallel to the height direction through the center of the CPP thin-film magnetic head for illustrating a step subsequent to the step shown in FIG. 9.

As shown in FIG. 10, as pretreatment before forming a top shield layer 30, the top surfaces 20a, 40a, and 50a of the thin-film magnetic head element 20, the insulating layer 40, and the low-resistance metal layer 50, respectively, are removed by, for example, ion milling or etching to expose respective fresh surfaces being free from surface oxide layers. The amounts of etching (amount of milling) required for removing the surface oxide layers formed on the thin-film magnetic head element 20, the insulating layer 40, and the low-resistance metal layer 50 are substantially the same. Therefore, any of the thin-film magnetic head element 20, the insulating layer 40, and the low-resistance metal layer 50 is not excessively etched, thus minimizing the amount of etching (amount of milling). As described above, the uppermost layer of the thin-film magnetic head element 20 is the cap layer 21 having the laminate structure containing the ruthenium film 21a and the tantalum film 21b. In this step, the tantalum film 21b is completely removed, and the ruthenium film 21a remains alone as the cap layer 21.

A top shield layer 30 is formed over the resulting ruthenium film 21a of the thin-film magnetic head element 20, the insulating layer 40, and the low-resistance metal layer 50 by sputtering. An open portion γ is formed on the insulating layer 40 between the thin-film magnetic head element 20 and the low-resistance metal layer 50, the open portion γ separating the top shield layer 30 into a first top shield sublayer 31 and a second top shield sublayer 32. The level of the first top shield sublayer 31 is substantially the same as that of the second top shield sublayer 32 in the z-direction shown in the figure. The levels of the first top shield sublayer 31 and the second top shield sublayer 32, both of which function as passages for the sense current I, are the same, thereby facilitating connection to an external device in the subsequent steps.

In this way, the CPP thin-film magnetic head shown in FIGS. 1 to 3 is produced.

Figure 11:
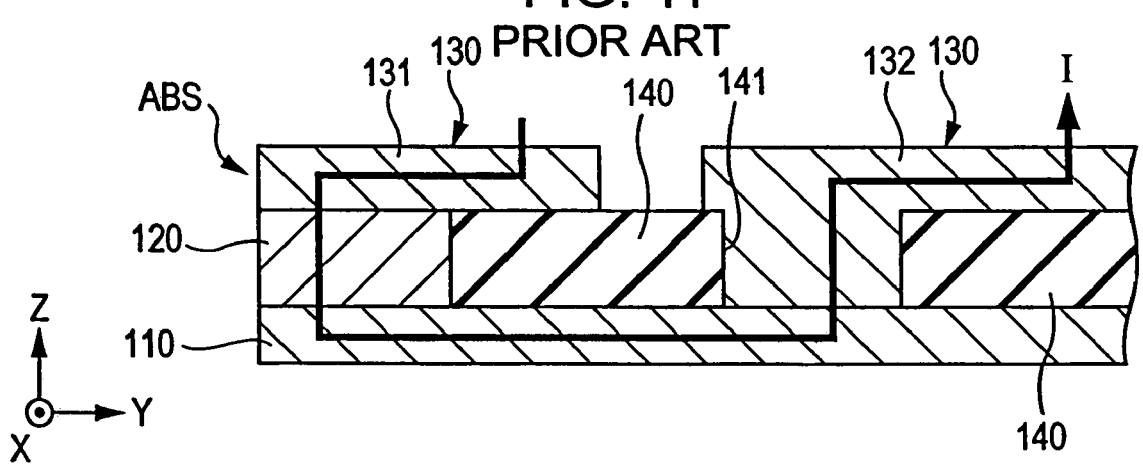
FIG. 11 is a fragmentary sectional view through the center of a traditional CPP thin-film magnetic head.

According to the embodiments described above, the step of removing the surface oxide layer on the bottom shield layer 10 exposed in the contact hole 41 and the step of the surface oxide layer on the thin-film magnetic head element 20 are performed separately, and the bottom shield layer 10 is etched while the top surface 20a of the thin-film magnetic head element 20 is covered with the third resist layer R3; hence, it is possible to completely remove the surface oxide layer on the bottom shield layer 10 without causing damage to the thin-film magnetic head element 20 due to etching. The low-resistance metal layer 50 is formed on the resulting bottom shield layer 10 where the surface oxide layer has been completely removed, the low-resistance metal layer 50 conductively connecting the bottom shield layer 10 with the second top shield sublayer 32. In the pretreatment before formation of the top shield layer 30, the top surface 20a of the thin-film magnetic head element 20 and the top surface 50a of the low-resistance metal layer 50 are etched at the same time. Therefore, it is possible to remove the surface oxide layer in the amount of etching (amount of milling) less than that required for a traditional structure in which the bottom shield layer is in direct contact with the second top shield sublayer (refer to FIG. 11), thereby reducing damage to the thin-film magnetic head element 20. Since no oxide layer is present throughout the current path through the first top shield sublayer 31, the thin-film magnetic head element 20, the bottom shield layer 10, the low-resistance metal layer 50, and the second top shield sublayer 32, a resistance that does not contribute to the element output is not increased. That is, the thin-film magnetic head element 20 is surely connected to the first top shield sublayer 31, and the low-resistance metal layer 50 is surely connected to the second top shield sublayer 32, thus stabilizing contact resistance. As a result, it is possible to reduce output noise of the element. Moreover, the surface oxide layer of the thin-film magnetic head element 20 can be removed in the minimum amount of etching; hence, there is no need to provide a thick cap layer, which is the uppermost layer of the thin-film magnetic head element 20. This is advantageous in reducing the interval between the shield layers.

According to the above-described embodiments, the low-resistance metal layer 50 which has a resistivity lower than those of the bottom shield layer 10 and the top shield layer 30 and which has a size greater than the track width Tw of the thin-film magnetic head element 20 in the x-direction shown in the figure is in contact with the bottom shield layer 10 and the second top shield sublayer 32, over large contact areas. Thus, at the interfaces between the low-resistance metal layer 50 and the bottom shield layer 10 and between the low-resistance metal layer 50 and the second top shield sublayer 32, the sense current I flows parallel to the interfaces, thereby reducing the resistances at the bottom shield layer 10 and the second top shield sublayer 32.

The CPP thin-film magnetic head according to the embodiments can be applied to not only a playback thin-film magnetic head but also a recording/playback thin-film magnetic head in which an inductive head for recording is laminated to the playback thin-film magnetic head.

What is claimed is:

1. A method for producing a CPP thin-film magnetic head comprising a thin-film magnetic head element and an insulating layer between a bottom shield layer and a top shield layer, the insulating layer being disposed behind the thin-film magnetic head element in a height direction, wherein a current flows in a direction orthogonal to a surface of a layer constituting the thin-film magnetic head element, the method comprising the steps of:

forming the insulating layer;

forming a resist layer for lift-off processing on the thin-film magnetic head element and the insulating layer, the resist layer comprising a space for forming a hole, the space being disposed at a predetermined position behind the thin-film magnetic head element in the height direction;

removing the insulating layer exposed in the space and completely removing a surface oxide layer on the bottom shield layer directly below the insulating layer in the space, while a top surface of the thin-film magnetic head element is covered with the resist layer;

forming a metal layer on a portion generated by removing the insulating layer and the surface oxide layer on the bottom shield layer, and then removing the resist layer by lift-off processing; and separating the top shield layer into a first top shield sublayer and a second top shield sublayer, the first top shield sublayer being disposed on the thin-film magnetic head element and the insulating layer, the second top shield sublayer being disposed on the insulating layer and the metal layer.

2. The method for producing a CPP thin-film magnetic head according to claim 1, wherein the insulating layer and the metal layer are formed so as to have thicknesses such that a top surface of the insulating layer, the top surface of the metal layer, and a top surface of the thin-film magnetic head element are in the same plane.

3. The method for producing a CPP thin-film magnetic head according to claim 1, wherein a uppermost layer of the thin-film magnetic head element is formed of a cap layer having a laminate structure containing a ruthenium film and a tantalum film, in the step of removing the surface oxide layer on the bottom shield layer, the tantalum film of the cap layer being completely removed to expose the ruthenium film, and then the first top shield sublayer being formed on the ruthenium film.

* * * * *